Patented Aug. 6, 1940

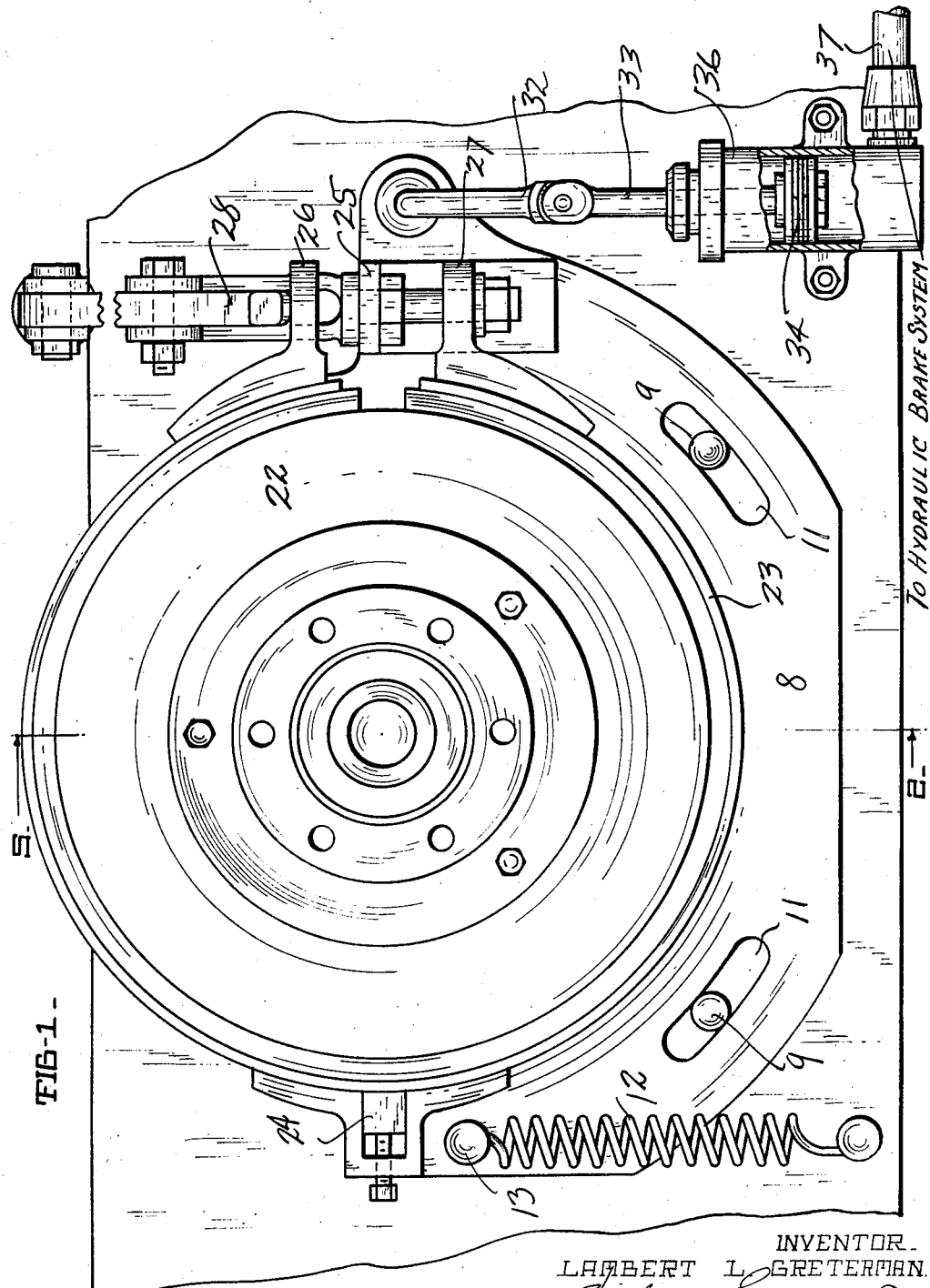

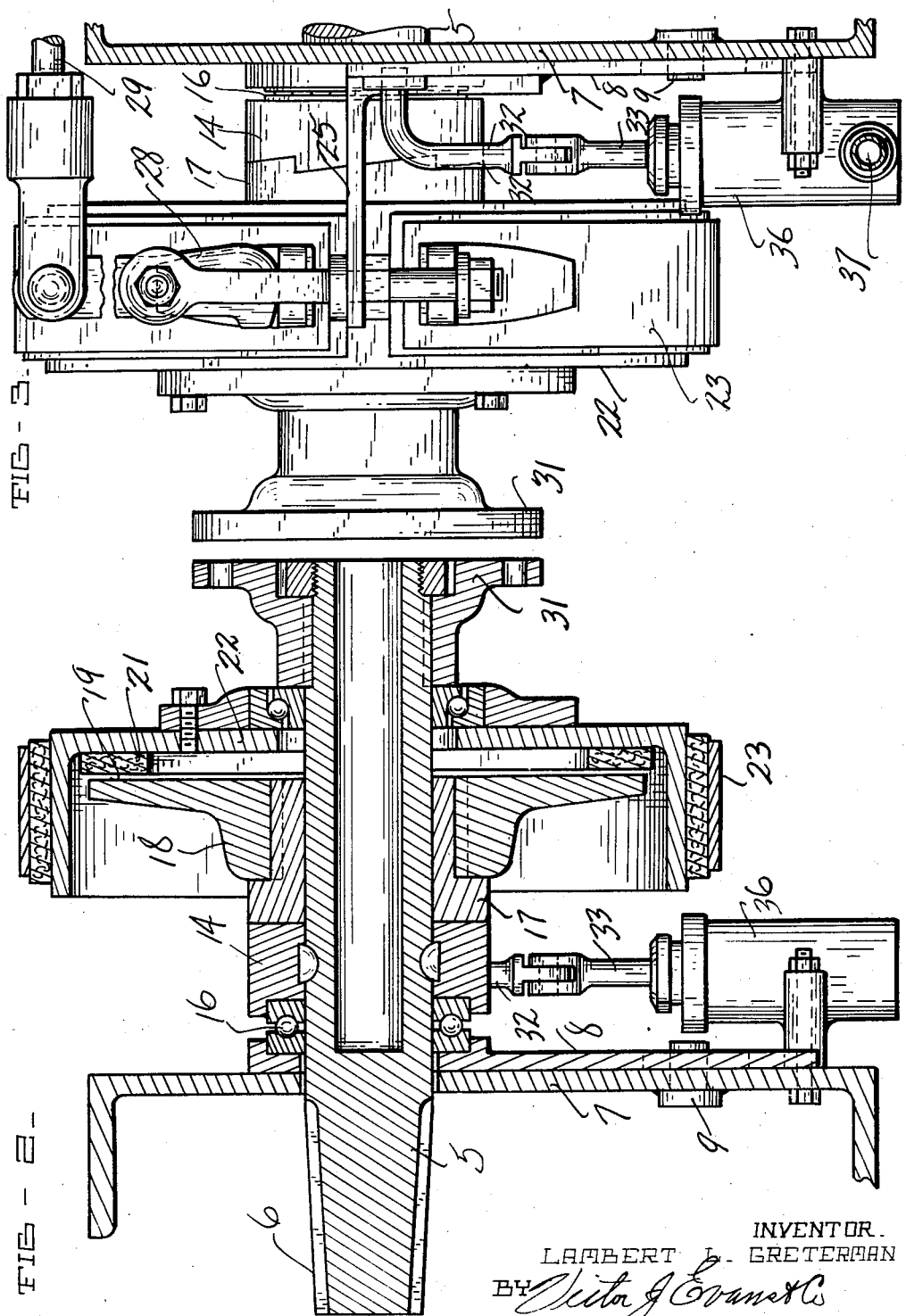

2,210,757

UNITED STATES PATENT OFFICE 2,210,757

BRAKING MECHANISM

Lambert L. Greterman, Santa Monica, Calif.

Application January 5, 1938, Serial No. 183,524

4 Claims. (Cl. 188—30)

This invention relates to automatic brakes for automobiles and similar devices and has for its primary object the provision of an efficient and inexpensive device of this character which may be easily and quickly installed on an automobile and connected with the drive shaft thereof, and to provide mechanism whereby the transmission thereof will automatically apply the brakes of the automobile, to stop the automobile should a reverse movement occur to said automobile when the transmission is in any of its positions other than reverse position, thereby providing a safety device to prevent the automobile from rolling rearwardly when attended or unattended and which will permit the driver to operate the automobile in a reverse direction whenever desired by the usual positioning of the gear shift lever of the transmission.

A further object is to produce a device of this character which is economical to manufacture and which may be easily installed in the average vehicle.

Other objects and advantages will be apparent during the course of the following description.

In the accompanying drawings forming a part of this specification and in which like numerals are employed to designate like parts throughout the same:

Fig. 1 is an end elevation of the device as the same would appear when connected to the drive shaft thereof;

Fig. 2 is a vertical cross sectional view taken on the line 2—2 of Fig. 1; and

Fig. 3 is a side elevation of Fig. 1, looking from the right thereof.

Many serious accidents have occurred due to a motor vehicle moving backwardly down a hill. I have, therefore, devised a means for preventing this backward movement by causing the movement of the vehicle to automatically apply the brakes and to maintain the same applied during the period of possible movement.

In the accompanying drawings wherein for the purpose of illustration is shown a preferred embodiment of my invention, the numeral 5 designates a shaft which may be connected to the shaft extending from the rear of the transmission through the medium of splines 6. A support is shown at 7 which is a portion of the vehicle and serves to mount a plate 8, which is free to move about the shaft 5, which movement is limited by studs 9 extending into slots 11, said studs being secured to the said frame member 7. This plate 8 is normally maintained in one position by a spring 12 secured to the support 7 and to the plate as at 13. Keyed to the shaft 5 is a jaw clutch portion 14 which is spaced from the plate 8 by roller bearings 16. This jaw clutch portion engages its coacting portion 17 which is freely rotatable on the shaft 5 and carries a plate 18 splined thereon and having a friction surface 19 adapted to bear against a friction ring 21, carried on the interior of the drum 22 and freely rotatable on the shaft 5. This drum 22 has a brake band 23 surrounding the same and the band is supported at its central portion by an adjustable bracket 24 carried upon the plate 8 and having its free ends provided with lugs 26 and 27 which are normally held pressed toward each other by a cam 28 actuated by a pull rod 29 operated by the driver of the car. The shaft 5 may be connected to the propeller shaft as through the medium of the collar 31 which is keyed thereto. The plate 8 has a crank arm 32, which is connected to a piston rod 33 carrying a piston 34 enclosed in the cylinder 36, which cylinder is in turn connected by a pipe 37 to the hydraulic brake system of a motor vehicle, such as shown in U. S. patent to F. O. Miller, No. 2,097,889, dated Nov. 2, 1937. The pipe 37 of my invention would be attached to the four-way coupling 9 of the patent. However, this invention could be attached to any hydraulic brake system by tapping in at any point on the system of the usual hydraulic brake line system (not shown).

The result of this construction is that when the parts are in the position of the figures, the pull rod 29 will be in such a position that the cam 28 will maintain the brake band 23 in tight engagement with the drum 22, it, of course, being understood that there is brake lining material between the brake band and the surface of the drum. Now, we will assume that the vehicle is upon a grade and there is a tendency for the vehicle to roll backwardly down the hill; and assuming that the driver of the vehicle has not set the brakes properly and that the vehicle does move slightly rearwardly, the result will be that the jaw clutch portion 14 moving in a retrograde direction will push the jaw clutch portion 17 along the shaft 5 or toward the right of Fig. 2. This will push the plate 18 against the friction ring 21, which will tend to rotate the drum 22 and the plate 8 to which it is connected through the brackets 24 and 25. As the plate 8 tends to rotate against the tension of the spring 12, the crank arm 32 will move downwardly against the piston rod 33, thus moving the piston 34 downwardly in its cylinder 36, compressing oil therein and forcing the same through the hydraulic brake line, thus applying pressure to all of the brakes of the vehicle.

When the vehicle is moving in a reverse direction under the will of the operator, then the pull rod 29, which is operated by the driver of the car, causes the cam 28 to release the brake band 23, thus permitting the drum to rotate freely. It is apparent that forward motion of the vehicle does not affect the apparatus, and, therefore, the same is inoperative during that period.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a driven shaft, a plate pivoted for movement about the axis of said shaft, a drum rotatable on said shaft, friction means mounted on said drum, a friction plate mounted on said shaft, means for moving said friction plate longitudinally along said shaft into clutching arrangement with said drum, friction means when said shaft rotates in a retrograde direction from its normal direction of rotation, means connected to said first mentioned plate, said means being normally frictionally clamped to the periphery of the drum for rotation therewith, and a braking mechanism actuated by the aforesaid movement of said second-mentioned plate into clutching engagement with the drum to effect rotation thereof.

2. In a device of the character described, a driven shaft, a plate pivoted for movement about the axis of said shaft, a drum rotatable on said shaft, friction means mounted on said drum, a friction plate mounted on said shaft, means for moving said friction plate longitudinally along said shaft into engagement with said drum when said shaft rotates in a retrograde direction from its normal direction of rotation, a peripheral band for normally frictionally engaging said drum, said band being connected to said first mentioned plate, whereby to rotate the latter, and a braking mechanism adapted to be actuated by the aforesaid movement of said second mentioned plate.

3. In a device of the character described, a driven shaft, a plate pivoted for movement about the axis of said shaft, a drum rotatable on said shaft, friction means mounted on said drum, a friction plate mounted on said shaft, means for moving said friction plate longitudinally along said shaft into engagement with said drum when said shaft rotates in a retrograde direction from its normal direction of rotation, means for normally frictionally engaging said drum, said means being connected to the first mentioned plate, a braking mechanism adapted to be actuated by the aforesaid movement of the second mentioned plate, and means operated by the operator of the automobile for controlling the drum frictional engaging means.

4. A device of the character described, a driven shaft, a plate pivoted for movement about the axis of said shaft, a drum rotatable on said shaft, friction means mounted on said drum, a friction plate mounted on said shaft, means for moving the friction plate longitudinally along said shaft into engagement with said drum when said shaft rotates in a retrograde direction from its normal rotation, a peripheral band normally frictionally engaging said drum, said peripheral band being connected to said first mentioned plate, a cylinder in communication with the pipe line of a hydraulic brake system, and a piston in said cylinder adapted to be actuated by the aforesaid movement of the second mentioned plate for compressing the fluid and applying the brakes.

LAMBERT L. GRETERMAN.